(12) United States Patent
Song et al.

(10) Patent No.: US 12,307,808 B2
(45) Date of Patent: May 20, 2025

(54) FORGED FINGERPRINT IDENTIFICATION METHOD AND FORGED FINGERPRINT IDENTIFICATION APPARATUS, AND STORAGE MEDIUM STORING INSTRUCTIONS TO PERFORM FORGED FINGERPRINT IDENTIFICATION METHOD

(71) Applicant: Suprema Inc., Seongnam-si (KR)

(72) Inventors: Bong Seop Song, Seongnam-si (KR); Jong Man Lee, Seongnam-si (KR); Jae Hyun Park, Seongnam-si (KR); Young Mook Kang, Seongnam-si (KR); Hochul Shin, Seongnam-si (KR)

(73) Assignee: Suprema Inc., Seongnam-si (KR)

( * ) Notice: Subject to any disclaimer, the term of this patent is extended or adjusted under 35 U.S.C. 154(b) by 0 days.

(21) Appl. No.: 18/518,115

(22) Filed: Nov. 22, 2023

(65) Prior Publication Data

US 2024/0203157 A1 Jun. 20, 2024

(30) Foreign Application Priority Data

Dec. 16, 2022 (KR) ........................ 10-2022-0177608

(51) Int. Cl.
| | | |
|---|---|---|
| *G06V 40/13* | (2022.01) | |
| *G06F 21/32* | (2013.01) | |
| *G06F 21/44* | (2013.01) | |
| *G06V 40/12* | (2022.01) | |
| *G06V 40/20* | (2022.01) | |
| *G06V 40/40* | (2022.01) | |

(52) U.S. Cl.
CPC .......... *G06V 40/1388* (2022.01); *G06F 21/32* (2013.01); *G06F 21/44* (2013.01); *G06V 40/1306* (2022.01); *G06V 40/1365* (2022.01); *G06V 40/20* (2022.01); *G06V 40/45* (2022.01)

(58) Field of Classification Search
CPC .......... G06V 40/1335; G06V 40/1382; G06V 40/1388; G06V 40/1394
See application file for complete search history.

(56) References Cited

U.S. PATENT DOCUMENTS

| | | | |
|---|---|---|---|
| 2019/0095735 A1* | 3/2019 | Shah | .................... H04L 63/0861 |
| 2022/0254187 A1* | 8/2022 | Yin | ........................ H04N 23/61 |

* cited by examiner

*Primary Examiner* — Joseph R Haley
(74) *Attorney, Agent, or Firm* — Bridgeway IP Law Group, PLLC; Jihun Kim

(57) ABSTRACT

There is provided a forged fingerprint identification method. The method comprises obtaining a first fingerprint image for a fingerprint for an input finger of a target user at a first position; obtaining a second fingerprint image for the fingerprint for the input finger of the target user at a second position; and determining whether the fingerprint of the target user is a forgery based on a result of comparison of a result of fingerprint comparison between the first fingerprint image and the second fingerprint image with predetermined threshold conditions.

18 Claims, 8 Drawing Sheets

FORGED FINGERPRINT IDENTIFICATION METHOD AND FORGED FINGERPRINT IDENTIFICATION APPARATUS, AND STORAGE MEDIUM STORING INSTRUCTIONS TO PERFORM FORGED FINGERPRINT IDENTIFICATION METHOD

CROSS-REFERENCE TO RELATED APPLICATIONS

This application claims the priority of Korean Patent Application No. 10-2022-0177608 filed on Dec. 16, 2022, in the Korean Intellectual Property Office, the disclosure of which is incorporated herein by reference.

TECHNICAL FIELD

The present disclosure relates to a forged fingerprint identification method and a forged fingerprint identification device for performing the method.

This work was supported by Institute of Information & communications Technology Planning & Evaluation (IITP) grant funded by the Korea government (MSIT; Ministry of Science and ICT) (No. 2020-0-01787-001, Development of innovative communication and computing convergence technology for superintelligence services).

BACKGROUND

As is widely known, with the development of information and communication technology, the importance of user authentication has increased. Recently, various user authentication methods have been developed in addition to conventional authentication methods using code input such as passwords.

In particular, user authentication methods through biometric information recognition are not only convenient to use but also have excellent security because the methods have no risk of oblivion or loss. Although authentication methods using biometric information have been mainly used in embedded systems such as personal computers (PCs) or ATMs (automated teller machines), application thereof has extended to mobile devices with the recent development in technology.

Among various types of biometric information, in particular, fingerprints have advantages of maintaining the same form throughout life, rapid reproduction of their original form even in the event of damages due to external factors, very low probability of one having the same fingerprint as those of other people, such as 1 in 1 billion, and the like. Owing to such advantages, fingerprints among various types of biometric information are adopted as an authentication means in many cases and used in various fields.

However, in the case of fingerprints among biometric information, the convenience of obtaining and forging fingerprints of other people and then using them in the form of a forged finger for malicious purposes is considered to be relatively higher than that of other biometric information such as an iris or a blood vessel, and thus identification and countermeasures for forged fingerprints are required.

SUMMARY

An object of the present disclosure is to provide a forged fingerprint identification method and device capable of accurately identifying a forged fingerprint in in-display type fingerprint authentication in which a fingerprint image is obtained through a fingerprint input area provided on an image display surface.

The aspects of the present disclosure are not limited to the foregoing, and other aspects not mentioned herein will be clearly understood by those skilled in the art from the following description.

In accordance with an aspect of the present disclosure, there is provided a forged fingerprint identification method to be performed by a forged fingerprint identification apparatus including a memory and a processor, the method comprises: capturing a fingerprint for an input finger of a target user at a first position within a fingerprint input area formed on at least a portion of a display screen, and storing the captured fingerprint for the input finger of the target user at the first position as a first fingerprint image of the target user; detecting a movement for the input finger of the target user in a state of being in contact with the display screen; determining a second position at which the movement is stopped; capturing the fingerprint for the input finger of the target user at the second position within the fingerprint input area, and storing the captured fingerprint for the input finger of the target user at the second position as a second fingerprint image of the target user; and determining whether the fingerprint of the target user is a forgery based on a result of comparison of a result of fingerprint comparison between the first fingerprint image and the second fingerprint image with predetermined threshold conditions.

The determining whether the fingerprint of the target user is a forgery may include comparing the first fingerprint image with the second fingerprint image, and determining a first result of a comparison between the first fingerprint image and the second fingerprint image; comparing the first result of the comparison with the predetermined threshold conditions, and determining a second result of a comparison between the first result of the comparison and predetermined threshold conditions; and determining whether the fingerprint of the target user is the forgery based on the second result of comparison.

The forged fingerprint identification method may include setting a screen unlock pattern input by an input finger of a reference user, and determining a movement pattern for the movement of the input finger of the target user from the first position to the second position. The determining of whether the fingerprint is the forgery may include comparing the determined movement pattern for the movement of the target user with the set screen unlock pattern for the input of the reference user, and determining whether the fingerprint is the forgery based on a result of comparison between the determined movement pattern for the movement of the target user and the set screen unlock pattern for the input of the reference user.

The setting the screen unlock pattern may include detecting a movement for the input finger of the reference user on the display screen, and determining a reference input angle between a pointing direction of the input finger of the reference user and a reference line set on the display screen. The capturing the fingerprint of the target user at the first position may include determining a first input angle between a pointing direction of the input finger of the target user and the reference line set on the display screen. The capturing the fingerprint of the target user at the second position may include determining a second input angle between a pointing direction of the input finger of the target user and the reference line set on the display screen. The determining of whether the fingerprint of the target user is the forgery may include comparing at least one of the first input angle and the second input angle with the reference input angle, and determining whether the fingerprint of the target user is the forgery based on a result of a comparison between at least one of the first input angle and the second input angle with the reference input angle.

The determining the reference input angle may include determining a first reference input angle between a pointing direction of the input finger of the reference user at the first position and a reference line set on the display screen, and setting the first reference input angle. The determining of whether the fingerprint of the target user is the forgery may include comparing the first input angle with the first reference input angle, and determining whether the fingerprint of the target user is the forgery based on a result of the comparison between the first input angle and the first reference input angle.

The determining the reference input angle may include determining a second reference input angle between a pointing direction of the input finger of the reference user at the second position and the reference line set on the display screen, and setting the second reference input angle. The determining of whether the fingerprint of the target user is the forgery may include comparing the second input angle with the second reference input angle, and determining whether the fingerprint of the target user is the forgery based on a result of the comparison between the second input angle and the second reference input angle.

The forged fingerprint identification method may include capturing each fingerprint for the input finger of the target user at one or more third positions within the fingerprint input area, respectively, and storing the each captured fingerprint for the input finger of the target as each third fingerprint image of the target user. The determining of whether the fingerprint is the forgery includes comparing at least two of the first fingerprint image, the second fingerprint image, and each third fingerprint image, and determining a comparison result between at least two of the first fingerprint image, the second fingerprint image, and each third fingerprint image; and determining whether the fingerprint is the forgery based on the comparison result between at least two of the first fingerprint image, the second fingerprint image, and each third fingerprint image.

The one or more third positions within the fingerprint input area are determined based on a distance between the first position and the second position and the number of third fingerprint image.

The determining whether the fingerprint is the forgery may include dividing the first fingerprint image into a plurality of first sub images; dividing each third fingerprint image into a plurality of third sub images; comparing the plurality of the first sub images respectively with the plurality of the third sub images; and determining whether the fingerprint is the forgery based on a comparison result of the plurality of the first sub images respectively with the plurality of the third sub images.

The comparing the plurality of the first sub images respectively with the plurality of the second sub images may include selecting a head region from each of the first sub images and second sub images depending on the direction of movement, and setting a threshold range between a first threshold value and a second threshold value is set as a threshold conditions for the head region, and a third threshold value among the set threshold conditions is set for a residual partial region of each of the first sub images and second sub images excluding the head region.

The determining of whether the fingerprint is the forgery may include obtaining an intermediate gradient of the head region and an intermediate gradient of the residual partial regions with respect to the first fingerprint image and the third fingerprint image, and then counting a number of times an intermediate threshold condition is not satisfied based on results of comparison of an intermediate gradient with the threshold range and the third threshold value; obtaining a final gradient of the head region and a final gradient of the residual partial region with respect to the third fingerprint image and the second fingerprint image, and then determining whether a final threshold condition is satisfied based on results of comparison of the final gradient with the threshold range and the third threshold value; and determining that the fingerprint is not a forgery if it is determined that the final threshold condition is satisfied and the number of times the intermediate threshold condition is not satisfied is less than a threshold number of times.

The third threshold value is adjusted according to change in the direction of movement.

In accordance with another aspect of the present disclosure, there is provided a forged fingerprint identification device apparatus, the apparatus comprises: a fingerprint image acquisition device configured to capture a fingerprint for an input finger of a target user at a fingerprint input area formed on at least a portion of a display screen and store the captured fingerprint for the input finger of the target user at the first position as a first fingerprint image of the target user; a touch sensor configured to sense a touch on a touch sensing area corresponding to the display screen; a memory configured to store one or more instructions; and a processor unit configured to execute the one or more instructions stored in the memory, wherein the instructions, when executed by the processor, cause the processor to: control the fingerprint image acquisition device to obtain the first fingerprint image of the target user; detect a movement for the input finger of the target user in a state of being in contact with the display screen through the touch sensor, and detect a second position at which the movement is stopped; control the fingerprint image acquisition device to capture the fingerprint for the input finger of the target user at the second position within the fingerprint input area, and storing the captured fingerprint for the input finger of the target user at the second position as a second fingerprint image of the target user; and determine whether the fingerprint of the target user is a forgery based on a result of comparison of a result of fingerprint comparison between the first fingerprint image and the second fingerprint image with predetermined threshold conditions.

The processor unit is configured to: compare the first fingerprint image with the second fingerprint image, and determine a first result of a comparison between the first fingerprint image and the second fingerprint image; compare the first result of the comparison with the predetermined threshold conditions, and determine a second result of a comparison between the first result of the comparison and predetermined threshold conditions; and determine whether the fingerprint of the target user is the forgery based on the second result of comparison.

The processor unit is configured to: set a screen unlock pattern input by an input finger of a reference user, and determine a movement pattern for the movement of the input finger of the target user from the first position to the second position; compare the determined movement pattern for the movement of the target user with the set screen unlock pattern for the input of the reference user; and determine whether the fingerprint is the forgery further based on a result of comparison between the determined movement pattern for the movement of the target user and the set screen unlock pattern for the input of the reference user.

The processor unit is configured to: detect a movement for the input finger of the reference user on the display screen, and determine a reference input angle between a pointing direction of the input finger of the reference user and a reference line set on the display screen, determine a first input angle between a pointing direction of the input finger of the target user and the reference line set on the display screen, determine a second input angle between a pointing direction of the input finger of the target user and the reference line set on the display screen, compare at least one of the first input angle and the second input angle with the reference input angle, and determine whether the fingerprint of the target user is the forgery based on a result of a comparison between at least one of the first input angle and the second input angle with the reference input angle.

The processor unit is configured to: determine a first reference input angle between a pointing direction of the input finger of the reference user at the first position and a reference line set on the display screen, and set the first reference input angle, compare the first input angle with the first reference input angle, and determine whether the fingerprint of the target user is the forgery based on a result of the comparison between the first input angle and the first reference input angle.

The processor unit is configured to control the fingerprint image acquisition device to capture each fingerprint for the input finger of the target user at one or more third positions within the fingerprint input area, respectively, and store the each captured fingerprint for the input finger of the target as each third fingerprint image of the target user, wherein the processor unit is configured to: compare at least two of the first fingerprint image, the second fingerprint image, and each third fingerprint image, and determine a comparison result between at least two of the first fingerprint image, the second fingerprint image, and each third fingerprint image; and determine whether the fingerprint is the forgery based on the comparison result between at least two of the first fingerprint image, the second fingerprint image, and each third fingerprint image.

The one or more third positions within the fingerprint input area are based on a distance between the first position and the second position and the number of third fingerprint image.

In accordance with another aspect of the present disclosure, there is provided a non-transitory computer-readable recording medium storing a computer program, which comprises instructions for a processor to perform a forged fingerprint identification method, the method comprise: capturing a fingerprint for an input finger of a target user at a first position within a fingerprint input area formed on at least a portion of a display screen, and storing the captured fingerprint for the input finger of the target user at the first position as a first fingerprint image of the target user; detecting a movement for the input finger of the target user in a state of being in contact with the display screen; determining a second position at which the movement is stopped; capturing the fingerprint for the input finger of the target user at the second position within the fingerprint input area, and storing the captured fingerprint for the input finger of the target user at the second position as a second fingerprint image of the target user; and determining whether the fingerprint of the target user is a forgery based on a result of comparison of a result of fingerprint comparison between the first fingerprint image and the second fingerprint image with predetermined threshold conditions.

According to an embodiment of the present disclosure, in in-display type fingerprint authentication in which a fingerprint image is obtained through a fingerprint input area provided on an image display surface, it is determined whether or not a fingerprint is a forgery based on results of comparison between a fingerprint image obtained before an object having a fingerprint is a moved in a state of being in contact with the image display surface and a fingerprint image obtained after movement. For example, it is possible to accurately determine whether or not a fingerprint is a forgery according to a degree of distortion and/or a blurring direction of a fingerprint image obtained after movement relative to a fingerprint image obtained before movement.

DETAILED DESCRIPTION

Figure 1:
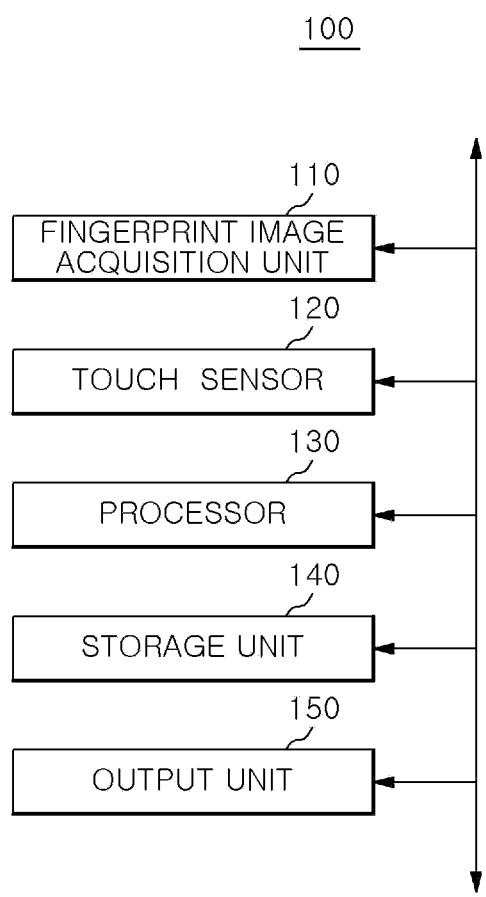
FIG. 1 is a configuration diagram of a computer device that can serve as a forged fingerprint identification device capable of performing a forged fingerprint identification method according to an embodiment of the present disclosure.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

Figure 2:
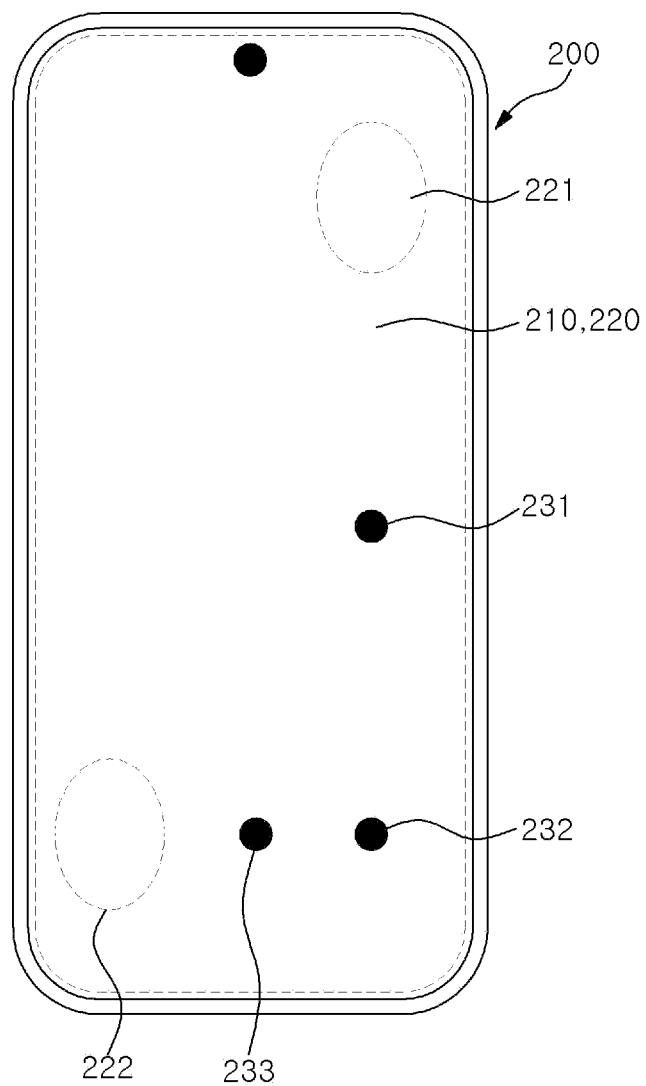
FIGS. 2 and 3 are diagrams showing use states when the computer device of FIG. 1 is implemented as a smart device such as a smartphone having an in-display fingerprint recognition and authentication function.
Figure 3:
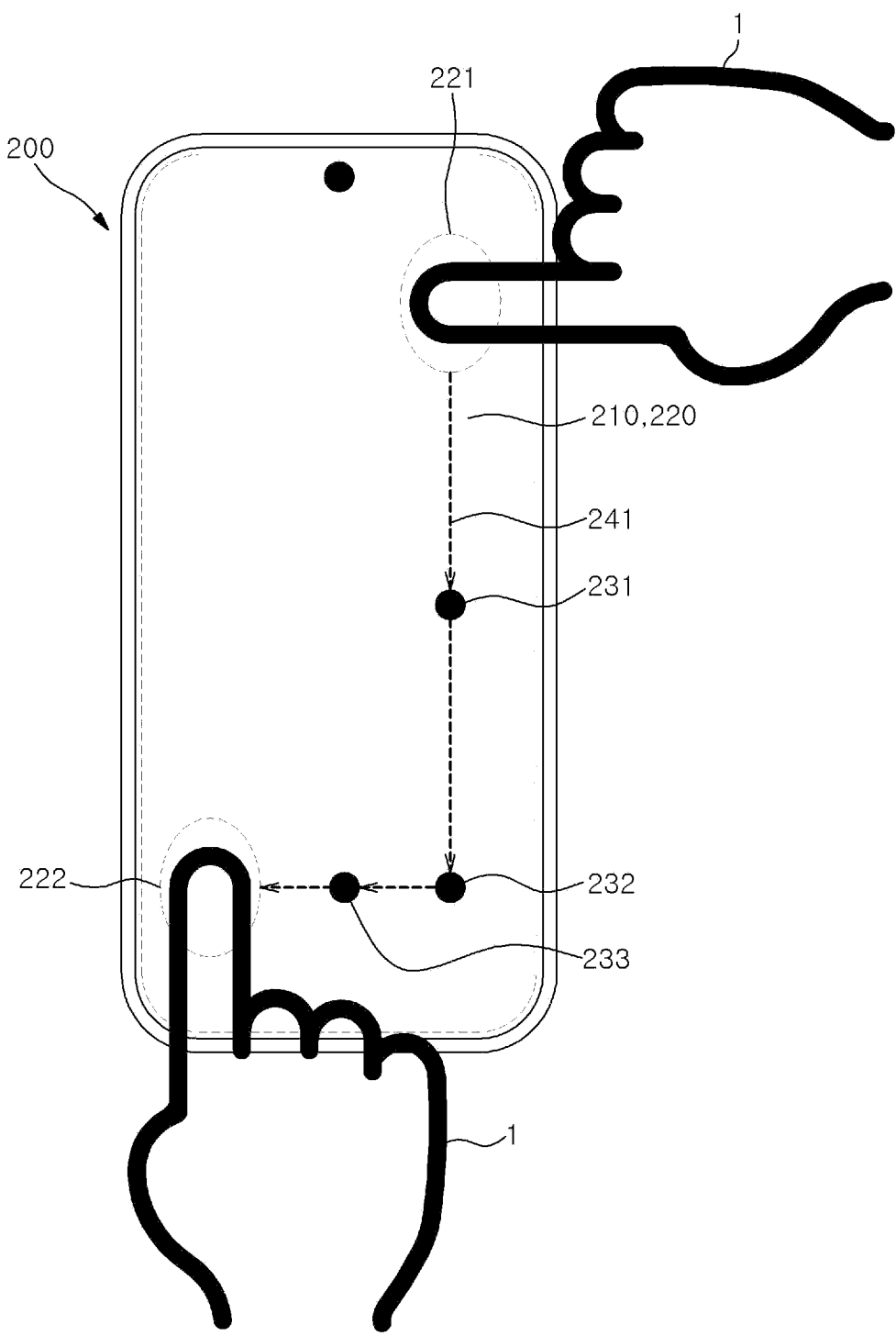

FIG. 1 is a configuration diagram of a computer device 100 that can serve as a forged fingerprint identification device capable of performing a forged fingerprint identification method according to an embodiment of the present disclosure, and FIGS. 2 and 3 are diagrams showing use states when the computer device 100 of FIG. 1 is implemented as a smart device such as a smartphone having an in-display fingerprint recognition and authentication function. Here, the computer device 100 includes various smart devices such as a smartphone illustrated in FIGS. 2 and 3, but is not limited thereto. In addition, the computer device 100 may obtain a fingerprint image, which is an authentication image for authenticating the body of a user, from a finger of the user and authenticate whether or not the user is a pre-registered user through authentication of the fingerprint image, but the following description will focus on processing of identifying a forged fingerprint in order to clarify the technical idea of the present disclosure.

The computer device 100 includes a fingerprint image acquisition unit 110, a touch sensor 120, and a processor 130, and may further include a storage unit 140 and/or an output unit 150. However, the configuration diagram shown in FIG. 1 is merely an example, and the idea of the present disclosure is not limitedly interpreted by the configuration diagram shown in FIG. 1. For example, the computer device 100 may include at least one component which is not shown in FIG. 1 or may not include at least one component shown in FIG. 1.

The storage unit 140 can be implemented by a medium for storing information. Such a medium includes, but is not limited to, a ROM, a RAM, or the like. The storage unit 140 stores at least one instruction or data executable by the processor 130 which will be described below. In addition, the storage unit 140 may store a computer program that allows the processor 130 to perform a forged fingerprint identification method.

The fingerprint image acquisition unit 110 obtains a fingerprint image of an object 1 through a fingerprint input area 220 formed over at least a portion of an image display surface 210 of a smartphone 200 or the like and provides the obtained fingerprint image to the processor 130. The fingerprint image acquisition unit 110 may obtain a fingerprint image over the entire area of the fingerprint input area 220. In the following description, an embodiment in which a first fingerprint image is obtained at a first position 221, a second fingerprint image is obtained at a second position 222, and at least one additional fingerprint image is obtained while the object 1 is moving along a predetermined pattern 241 in a state in which the object 1 is in contact with image display surface 210 will be described. The fingerprint image acquiring unit 110 may obtain an image frame by directly capturing an image of the image display surface 210 or may receive an image frame captured by a separately provided imaging device. To execute this function, the fingerprint image acquisition unit 110 may include an optical device for capturing an image. Although the image display surface 210 on which a user touches a fingerprint is basically a separate component from the fingerprint image acquisition unit 110, the image display surface 210 and the fingerprint input area 220 may be integrated.

The touch sensor 120 senses that the object 1, such as a user's finger, touches the image display surface 210 for position input and/or fingerprint input and provides a touch sensing result to the processor 130. The touch sensor 120 may include a capacitive sensor electrically connected to the image display surface 210.

The processor 130 may be implemented by a processing device having at least one core. For example, the processor 130 may be implemented by including at least one CPU or GPU. The processor 130 may read the aforementioned data or commands stored in the storage unit 140 and may record new data or commands in the storage unit 140. Further, the processor 130 may modify or delete already recorded data or commands.

The computer device 100 can perform various functions through the processor 130. For example, the computer device 100 can perform a forgery fingerprint identification method by serving as a forgery fingerprint identification device. To this end, the processor 130 controls the fingerprint image acquisition unit 110 such that it obtains a first fingerprint image of the object 1 through the first position 221 within the fingerprint input area 220, detects movement of the object 1 being in contact with the image display surface 210 through the touch sensor 120, controls the fingerprint image acquisition unit 110 such that it obtains a second fingerprint image of the object 1 through the second position 22 within the fingerprint input area 220 after movement of the object 1 is finished, and determines whether or not a fingerprint is a forgery based on a result of comparison of a result of comparison between the obtained first fingerprint image and the second fingerprint image with set threshold conditions.

Further, the processor 130 may determine whether or not the fingerprint is a forgery additionally based on the inclination of at least one of the first fingerprint image and the second fingerprint image, or a result of comparison between a detected movement pattern of the object 1 and a set pattern. To this end, the processor 130 may obtain information on fingerprint inclinations through the fingerprint image acquisition unit 110 and set it in advance, or obtain information on movement patterns through the fingerprint image acquisition unit 110 and/or the touch sensor 120 and set it in advance.

In addition, the processor 130 may control the fingerprint image acquisition unit 110 such that it additionally obtains an additional fingerprint image of the object 1 at least once through a different position within the fingerprint input area 220 while the object 1 is moving and reflect a result of comparison between the first fingerprint image and the additional fingerprint image or a result of comparison between the additional fingerprint image and the second fingerprint image in determination of whether or not a fingerprint is a forgery.

Further, at the time of additionally obtaining an additional fingerprint image, the processor 130 may determine a position at which the additional fingerprint image will be obtained based on the distance between the first position and the second position according to the set pattern and the number of additional acquisitions of the additional fingerprint image.

In addition, at the time of generating a fingerprint comparison result, the processor 130 may obtain N partial fingerprint images by dividing the first fingerprint image and the second fingerprint image into N partial regions, and then compare the partial fingerprint images N times for each partial region.

In addition, the processor 130 may select a head region from among the N partial regions according to the direction of movement, set a threshold range between first and second threshold values as set threshold conditions for the head region, and set a third threshold value among the set threshold conditions for the residual partial regions. The processor 130 may obtain an intermediate gradient of the head region and intermediate gradients of the residual partial regions with respect to the first fingerprint image and the additional fingerprint image, count the number of times an intermediate threshold condition is not satisfied based on results of comparison of the intermediate gradients with the threshold range and the third threshold value, obtain a final gradient of the head region and final gradients of the residual partial regions with respect to the additional fingerprint image and the second fingerprint image, determine whether a final threshold condition is satisfied based on results of comparison of the final gradients with the threshold range and the third threshold value, and determine that the fingerprint is not a forgery if it is determined that the final threshold condition is satisfied and the number of times the intermediate threshold condition is not satisfied is less than a threshold number of times. Here, the processor 130 may adjust the third threshold value according to a change in the direction of movement depending on a pattern while counting the number of times the intermediate threshold condition is not satisfied.

The storage unit 140 may be implemented as, for example, a computer-readable recording medium, and examples of such computer-readable recording media include magnetic media such as a hard disk, a floppy disc, and a magnetic tape, optical media such as a CD-ROM and a DVD, magneto-optical media such as a floptical disk, and hardware devices specially configured to store and execute program instructions, such as a flash memory. The storage unit 140 may store a computer program including instructions for allowing the processor 130 to perform the forged fingerprint identification method.

The output unit 150 may output results of various kinds of processing performed by the processor 130. Here, outputting may include outputting in a form recognizable by a user, outputting or transmitting various types of data through an interface and/or a communication channel. The output unit 150 may display a path of a pattern with respect to movement of the object 1 on the image display surface 210 using symbols 231, 232, and 233 (for example, "•") under the control of the processor 130.

Figure 6:
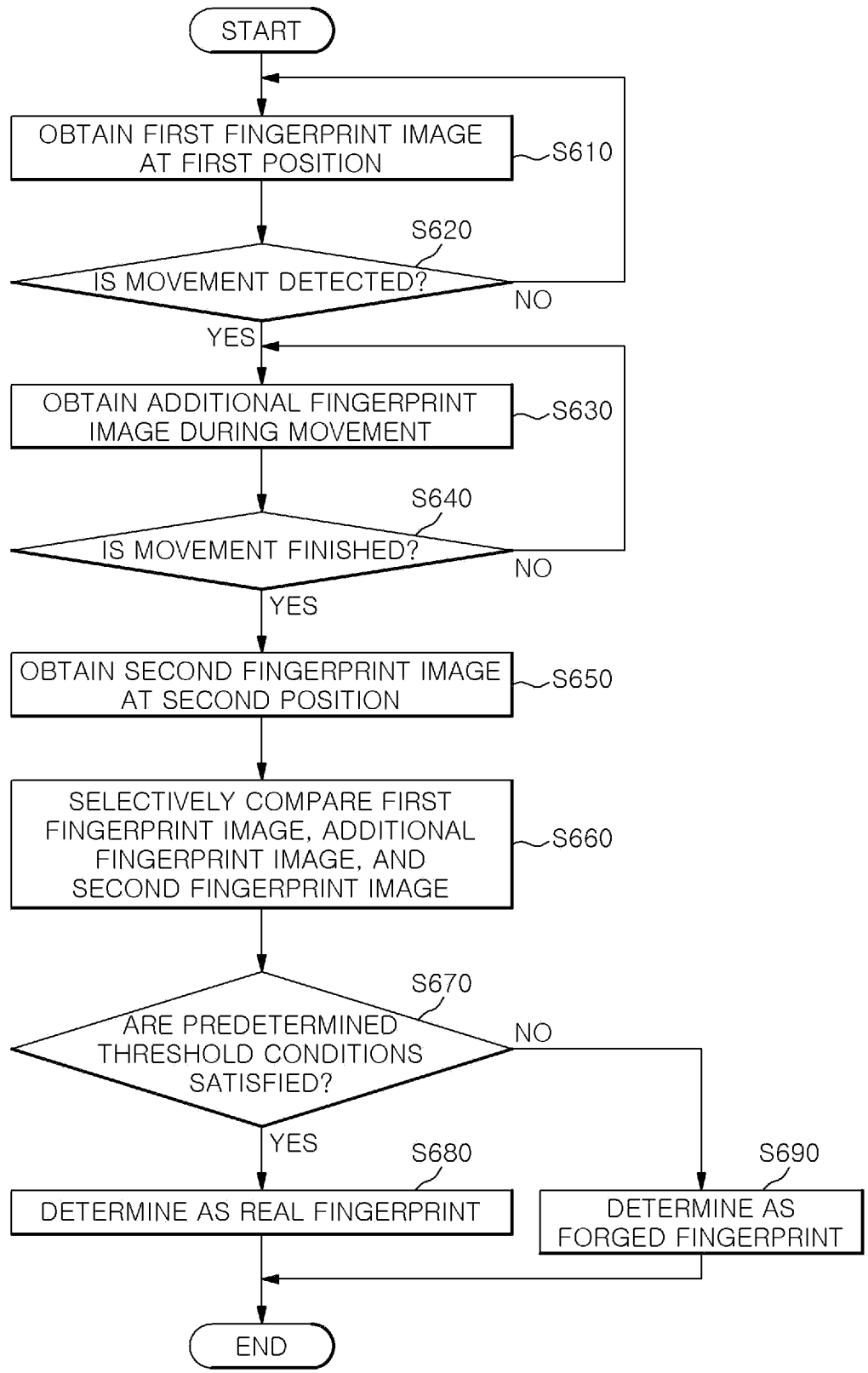
Figure 7:
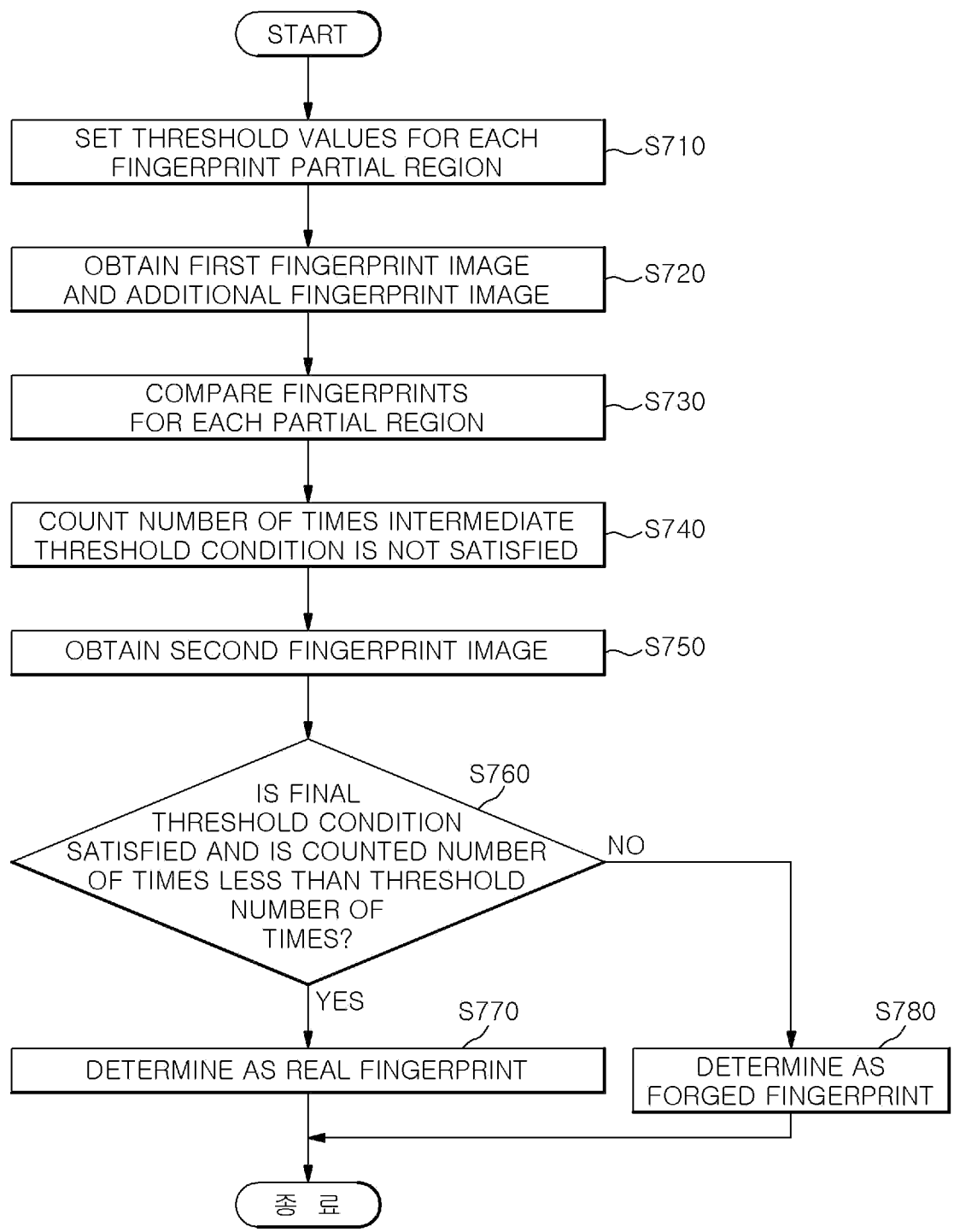
Figure 8:
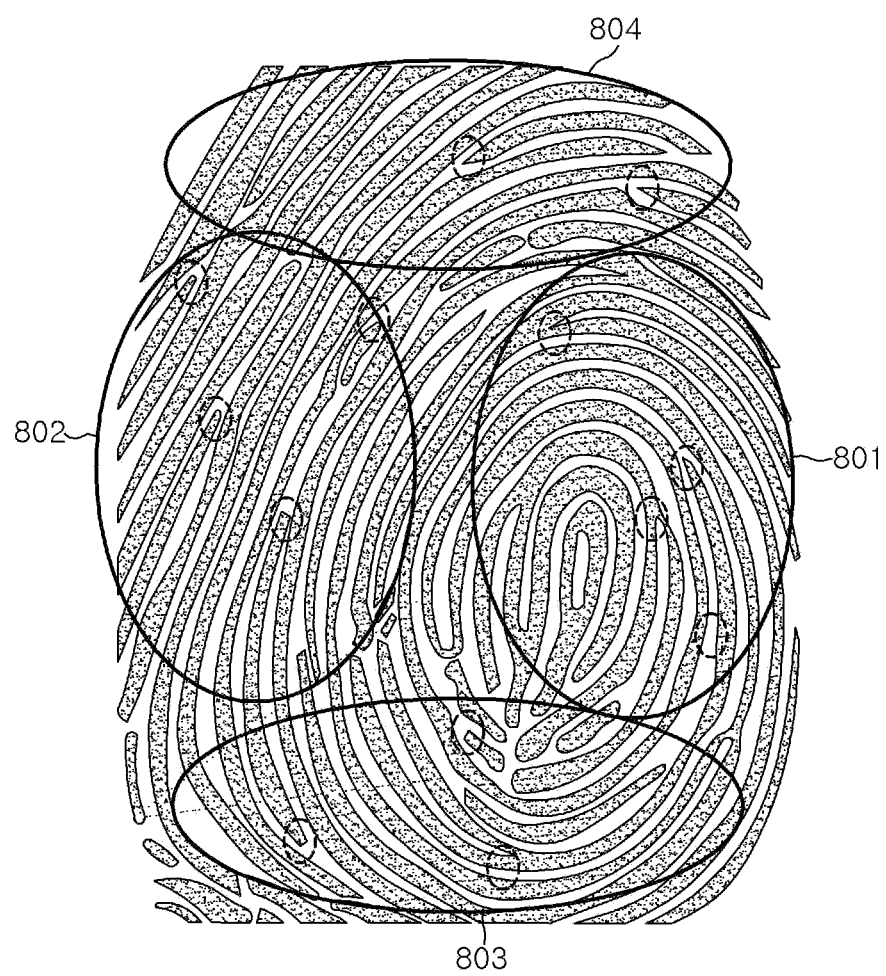
FIG. 8 is an exemplary diagram of a fingerprint image obtained during processing according to the forged fingerprint identification method according to an embodiment of the present disclosure.

FIGS. 4 to 7 are flowcharts illustrating a forged fingerprint identification method performed by the forged fingerprint identification device according to an embodiment of the present disclosure, and FIG. 8 is an exemplary diagram showing a fingerprint image obtained during processing according to the forged fingerprint identification method according to an embodiment of the present disclosure.

Hereinafter, the forged fingerprint identification method performed by the forged fingerprint identification device according to an embodiment of the present disclosure will be described in detail with reference to FIGS. 1 to 8.

Figure 4:
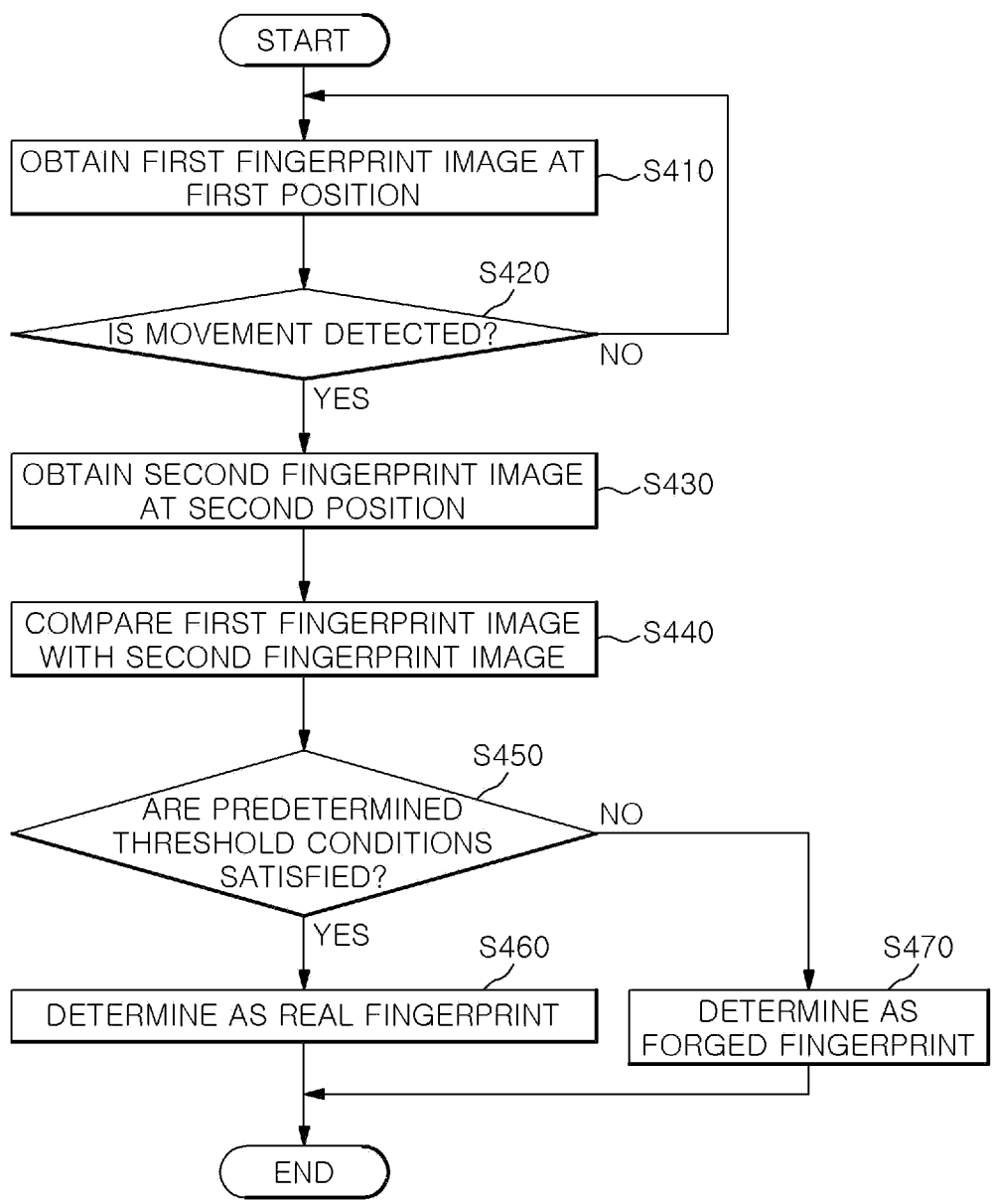
FIGS. 4 to 7 are flowcharts illustrating a forged fingerprint identification method performed by a forged fingerprint identification device according to an embodiment of the present disclosure.

Referring to FIG. 4, the processor 130 of the computer device 100 may control the fingerprint image acquisition unit 110 such that it obtains the first fingerprint image of the object 1 through the first position 221 within the fingerprint input area 220, and the fingerprint image acquisition unit 110 may obtain the first fingerprint image of the object 1 through the first position 221 within the fingerprint input area 220 under the control of the processor 130 and provide the first fingerprint image to the processor 130. Here, the first fingerprint image may be obtained by the processor 130 and the fingerprint image acquisition unit 110 in response to various events. For example, the first fingerprint image may be obtained when the image display surface 210 of the smartphone 200 changes from a dark state to a lock screen state, when a fingerprint authentication request is received through touch input through the image display surface 210, and the like, but the present disclosure is not limited to those specific events (S410).

After obtaining the first fingerprint image, the processor 130 waits for the object 1 to move while being in contact with the image display surface 210. At this time, the processor 130 may display a path of a pattern associated with the movement of the object 1 on the image display surface 210 using symbols 231, 232, and 233 (e.g., "•") to guide the moving path of the object 1. Such guidance of a path of a pattern associated with movement may not be performed, and thus the technical idea of the present disclosure is not particularly limited by such pattern path guidance.

The user may move the object 1 in a state in which the object 1 is in contact with the image display surface 210, and the touch sensor 120 may sense contact of the object 1 such as a user's finger with the image display surface 210 for position input and/or fingerprint input and provide a touch sensing result to the processor 130, and the processor 130 may detect and confirm movement of the object 1 from the first position 211 to the second position 222 along a predetermined pattern 241 (S420).

Then, the processor 130 may control the fingerprint image acquisition unit 110 such that it obtains the second fingerprint image of the object 1 through the second position 222 within the fingerprint input area 220, and the fingerprint image acquisition unit may obtain the second fingerprint image of the object 1 through the second position 222 within the fingerprint input area 220 under the control of the processor 130 and provide the obtained second fingerprint image to the processor 130 (S430).

In steps S410 and step S430, the first position 221 and the second position 222 at which the processor 130 obtains fingerprint images are shown as examples in FIGS. 2 and 3 to aid in understanding the description, and these positions are not particularly fixed in the fingerprint input area 220.

Thereafter, the processor 130 compares the first fingerprint image obtained in step S410 with the second fingerprint image acquired in step S430 (S440) and determines the first fingerprint image and/or the second fingerprint image obtained from the object 1 as a real fingerprint (S460) or a forged fingerprint (S470) according to whether a fingerprint comparison result meets set threshold conditions (S450).

In general, forged fingerprints are formed using various materials. Examples of such materials may include silicon, latex, wood glue, paper, overhead projector (OHP) film, and the like. Such forged fingerprint materials are different in hardness from human skin having a real fingerprint. Therefore, when a real fingerprint and a forged fingerprint are moved in a state of being in contact with the image display surface 210, distortion (e.g., change in minutiae indicating ridge ends or bifurcations in a fingerprint image, change in the distance between ridges, and the like) of the real fingerprint differs from distortion characteristics (i.e., a degree of distortion of the second fingerprint image from the first fingerprint image) of the forged fingerprint. Therefore, threshold conditions for distortion may be set in advance by measuring distortion characteristics when real fingerprints are moved in a state of being in contact with the image display surface 210 in advance, and the fingerprint image may be determined as a real fingerprint if distortion obtained as a result of fingerprint comparison in step S440 satisfies the preset threshold conditions and may be determined as a forged fingerprint if the obtained distortion does not satisfy the preset threshold conditions.

When the fingerprint comparison result with respect to the first fingerprint image and the second fingerprint image is generated in step S440, distortion characteristics over the entire area of the fingerprint may be collectively compared, or the fingerprint may be divided into N partial regions and then the partial regions may be compared N times. For example, as illustrated in FIG. 8, a fingerprint may be divided into a total of four partial regions 801, 802, 803, and 804. When the fingerprint is divided into N partial regions, different distortion characteristics are exhibited in the partial regions if the object 1 moves from the first position 221 to the second position 222 along the pattern 241. That is, distortion of the head region 802 due to the direction of movement is greater than distortion of the residual partial regions 801, 803, and 804. In consideration of such distortion characteristics of each partial region, the head region 802 can be set as a real fingerprint if distortion characteristics thereof are within the threshold range between the first threshold value and the second threshold value and the residual partial regions 801, 803, and 804 can be set as a real fingerprint only when distortion characteristics thereof are less than the third threshold when the threshold conditions of step S450 are set in advance.

Figure 5:
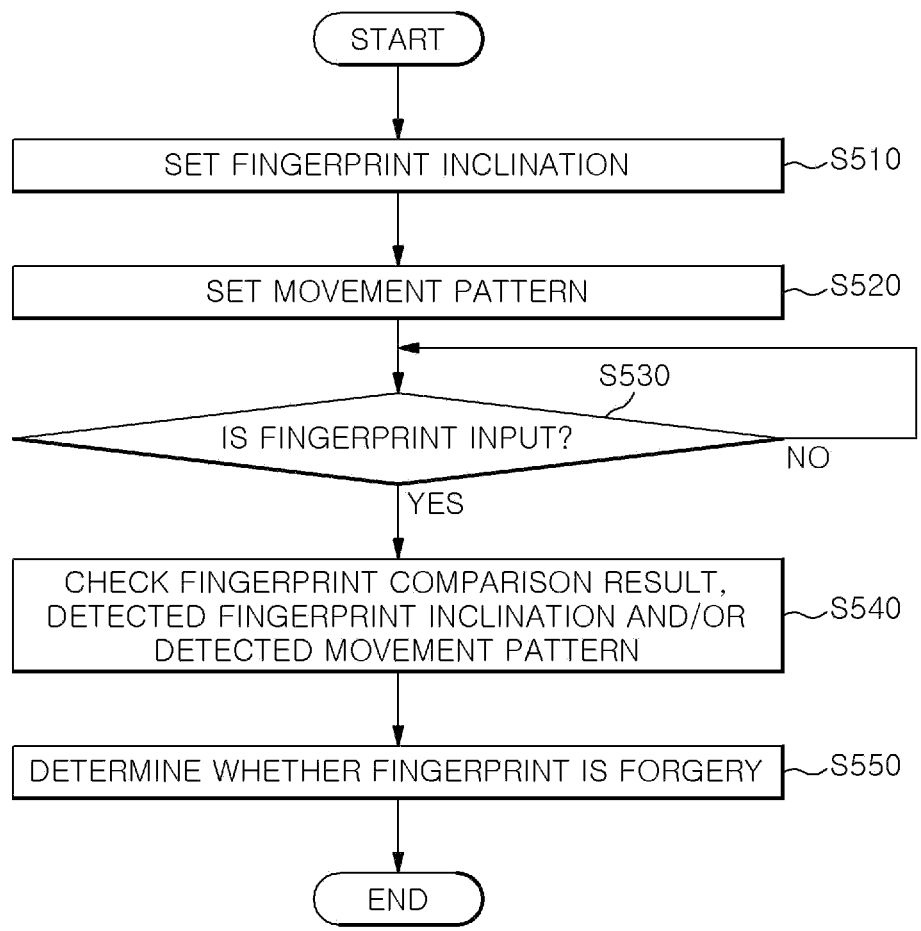

Referring to FIG. 5, the processor 130 may determine whether the fingerprint is a forgery by adding various conditions as well as a result of comparison of fingerprints before and after movement.

The processor 130 may obtain information on fingerprint inclination through the fingerprint image acquisition unit 110, preset the information (S510), obtain information on a movement pattern through the fingerprint image acquisition unit 110 and/or the touch sensor 120, and preset the information (S520). Only presetting of fingerprint inclination in step S510 may be performed, or only setting of a movement pattern in step S520 may be performed. As shown in the example of FIG. 3, fingerprint inclination may be set according to input in a horizontal direction at the first position 221 and according to input in a vertical direction at the second position 222. Fingerprint inclination is not limited to the exemplified horizontal and vertical directions, and various fingerprint inclinations may be input and set. For example, fingerprint inclination may be input and set based on central line arrangement of a fingerprint. As the movement pattern in step S520, various types of patterns other than "]" shape illustrated in FIG. 3 may be input and set.

Step S530 of FIG. 5 may correspond to steps S410 to S440 of FIG. 4, and step S540 of FIG. 5 may correspond to step S450 of FIG. 4. Even if fingerprint input in step S530 satisfies the set threshold conditions as in step S450, the processor 130 may determine the fingerprint as a real fingerprint (S540 and S550) if the fingerprint input has the same fingerprint inclination as the fingerprint inclination set in step S510 and/or if the fingerprint input has the same movement pattern as the movement pattern set in step S520.

The embodiment shown in FIG. 6 is a case in which an additional fingerprint image is obtained during movement of the object 1 along the pattern 241 in addition to acquisition of the first fingerprint image through the first position 221 and acquisition of the second fingerprint image through the second position 222.

When movement of the object 1 in a state of being in contact with the image display surface 210 is detected (S620) after acquisition of the first fingerprint image through the first position 221 (S610), the processor 130 additionally obtains an additional fingerprint image of the object 1 at least once through another position within the fingerprint input area 220 during the movement (S630). Here, the position at which the additional fingerprint image is obtained may be determined based on the distance L between the first position 221 and the second position 222 according to the set pattern 241 and the number N of additional acquisitions of the additional fingerprint image. For example, the result of an operation of L/N+1 may be a distance between additional fingerprint image acquisition positions.

After the movement of the object 1 is finished (S640), the processor 130 obtains the second fingerprint image through the second position 222 (S650).

According to this embodiment, the processor 130 may generate a result of selective comparison of the first fingerprint image, the additional fingerprint image, and the second fingerprint image. For example, the processor 130 may generate a result of comparison between the first fingerprint image obtained in step S610 and the additional fingerprint image obtained in step S630 or a result of comparison between the additional fingerprint image obtained in step S630 and the second fingerprint image generated in step S650 (S660). Then, the processor 130 determines the first fingerprint image, the additional fingerprint image, and the second fingerprint image obtained from the object 1 as a real fingerprint (S680) or a forged fingerprint (S690) according to whether or not the fingerprint comparison result generated in step S660 satisfies the set threshold conditions (S670).

The embodiment shown in FIG. 7 is a case in which the first fingerprint image is obtained through the first position 221, an additional fingerprint image is obtained through another position while the object 1 is moving along the pattern 241, and the second fingerprint image is obtained through the second position 222, like the embodiment shown in FIG. 6. In this embodiment, an intermediate threshold condition and a final threshold condition are set.

According to this embodiment, as described with reference to FIG. 8, the processor 130 respectively sets a threshold condition between the first threshold value and the second threshold value, and the third threshold value as an intermediate threshold condition and a final threshold condition for each of N partial regions (S710).

Then, the processor 130 counts the number of times a result of performing fingerprint comparison for each partial region (S730) does not satisfy the intermediate threshold condition whenever an additional fingerprint image is obtained (S720). Here, the "intermediate threshold condition" may mean determining whether or not the set threshold conditions are satisfied as in step S670 before the second fingerprint image to be finally obtained is input. For example, the processor 130 may obtain an intermediate gradient of the head region and intermediate gradients of the residual partial regions with respect to the first fingerprint image and the additional fingerprint image, and then count the number of times the intermediate threshold condition is not satisfied based on a result of comparison of the intermediate gradients with the threshold range and the third threshold value set in step S710 (S740). Meanwhile, the processor 130 may adjust the third threshold according to change in the direction of movement of the object 1 along the pattern 241 while counting the number of times the intermediate threshold condition is not satisfied. This is for the purpose of reflecting change in the degree of distortion of the fingerprint when the pattern 241 is maintained in a straight line and when the direction is changed at the position of the symbol 232. That is, since the degree of distortion increases as the change in the direction of movement increases, the third threshold value can be adjusted to be higher.

Subsequently, after obtaining the second fingerprint image through the second position 222, the processor 130 determines whether a result of comparison between a previously obtained additional fingerprint image and the second fingerprint image satisfies the final threshold condition and checks whether the number of times the intermediate threshold condition is not satisfied, counted in step S740, is less than the threshold number of times. For example, the processor 130 may obtain a final gradient of the head region and final gradients of the residual partial regions with respect to the additional fingerprint image and the second fingerprint image, and then determine whether the final threshold condition is satisfied based on results of comparison of the final gradients with the threshold range and the third threshold value set in step S710 (S760).

As a result of checking in step S760, the processor 130 may determine the first fingerprint image, the additional fingerprint image, and the second fingerprint image obtained from the object 1 as a real fingerprint (S770) if the result of comparison between the previously obtained additional fingerprint image and the second fingerprint image obtained in step S750 satisfies the final threshold condition and the number of times the intermediate threshold condition is not satisfied, counted in step S740, is less than the threshold number of times, and determine them as a forged fingerprint in other cases (S780).

Meanwhile, a computer program may be realized to include instructions for causing a processor to perform each step included in the forged fingerprint identification method performed by the forged fingerprint identification device according to the above-described embodiment.

In addition, a computer program including instructions for causing a processor to perform each step included in the forged fingerprint identification method performed by the forged fingerprint identification device according to the above-described embodiment may be recorded on a computer-readable recording medium.

According to an embodiment of the present described above, in in-display type fingerprint authentication in which a fingerprint image is obtained through a fingerprint input area provided on an image display surface, an object having a fingerprint is brought into contact with the image display surface, it is determined whether or not a fingerprint is a forgery based on a result of comparison between a fingerprint image obtained before an object having the fingerprint is moved in a state of being in contact with the image display surface and a fingerprint image obtained after the movement. For example, it is possible to accurately determine whether or not a fingerprint is a forgery according to a degree of distortion and/or a blurring direction of a fingerprint image obtained after movement relative to a fingerprint image obtained before movement.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A forged fingerprint identification method to be performed by a forged fingerprint identification apparatus including a memory and a processor, the method comprising:
   setting a screen unlock pattern by an input finger of a reference user through detecting a movement for the input finger of the reference user on a display screen and determining a reference input angle between a pointing direction of the input finger of the reference user and a reference line set on the display screen;
   determining a movement pattern for an input finger of a target user from a first position to a second position by:

capturing a fingerprint for the input finger of the target user at the first position within a fingerprint input area formed on at least a portion of the display screen and storing the fingerprint for the input finger of the target user at the first position as a first fingerprint image of the target user, wherein the capturing the fingerprint for the input finger of the target user at the first position includes determining a first input angle between a pointing direction of the input finger of the target user at the first position and the reference line set on the display screen;

detecting a movement for the input finger of the target user while in contact with the display screen;

determining the second position at which the movement for the input finger of the target user is stopped; and capturing the fingerprint for the input finger of the target user at the second position within the fingerprint input area and storing the fingerprint for the input finger of the target user at the second position as a second fingerprint image of the target user, wherein the capturing the fingerprint for the input finger of the target user at the second position includes determining a second input angle between a pointing direction of the input finger of the target user at the second position and the reference line set on the display screen; and determining whether the fingerprint for the input finger of the target user is a forgery based on the first fingerprint image, the second fingerprint image and predetermined threshold conditions, wherein the determining of whether the fingerprint for the input finger of the target user is the forgery includes comparing at least one of the first input angle and the second input angle with the reference input angle and determining whether the fingerprint for the input finger of the target user is the forgery based on a comparison between the first input angle or the second input angle with the reference input angle, and wherein the movement for the input finger of the target user occurs from the first position to the second position, and the first position and the second position are different.

2. The forged fingerprint identification method of claim 1, wherein the determining whether the fingerprint for the input finger of the target user is the forgery includes:
comparing the first fingerprint image with the second fingerprint image and determining a first result of a comparison between the first fingerprint image and the second fingerprint image;
comparing the first result of the comparison with the predetermined threshold conditions and determining a second result of a comparison between the first result of the comparison and the predetermined threshold conditions; and
determining whether the fingerprint for the input finger of the target user is the forgery based on the second result of the comparison.

3. The forged fingerprint identification method of claim 1, wherein the determining of whether the fingerprint for the input finger of the target user is the forgery includes comparing the movement pattern for the input finger of the target user with the screen unlock pattern and determining whether the fingerprint is the forgery based on a comparison between the movement pattern and the screen unlock pattern.

4. The forged fingerprint identification method of claim 1, wherein the determining the reference input angle includes determining a first reference input angle between a pointing direction of the input finger of the reference user at the first position and the reference line set on the display screen and setting the first reference input angle, and
wherein the determining of whether the fingerprint for the input finger of the target user is the forgery includes comparing the first input angle with the first reference input angle and determining whether the fingerprint for the input finger of the target user is the forgery based on a comparison between the first input angle and the first reference input angle.

5. The forged fingerprint identification method of claim 1, wherein the determining the reference input angle includes determining a second reference input angle between a pointing direction of the input finger of the reference user at the second position and the reference line set on the display screen and setting the second reference input angle, and
wherein the determining of whether the fingerprint for the input finger of the target user is the forgery includes comparing the second input angle with the second reference input angle and determining whether the fingerprint for the input finger of the target user is the forgery based on a comparison between the second input angle and the second reference input angle.

6. The forged fingerprint identification method of claim 1, further comprising capturing each fingerprint for the input finger of the target user at one or more third positions within the fingerprint input area, respectively, and storing the each fingerprint for the input finger of the target user as each third fingerprint image of the target user,
wherein the determining of whether the fingerprint is the forgery includes:
comparing at least two of the first fingerprint image, the second fingerprint image, and the each third fingerprint image; and
determining whether the fingerprint is the forgery based on a comparison between the at least two of the first fingerprint image, the second fingerprint image, and the each third fingerprint image.

7. The forged fingerprint identification method of claim 6, wherein the one or more third positions within the fingerprint input area are determined based on a distance between the first position and the second position and a number of the each third fingerprint image.

8. The forged fingerprint identification method of claim 6, wherein the determining whether the fingerprint is the forgery includes:
dividing the first fingerprint image into a plurality of first sub images;
dividing the each third fingerprint image into a plurality of third sub images;
comparing the plurality of the first sub images respectively with the plurality of the third sub images; and
determining whether the fingerprint is the forgery based on a comparison of the plurality of the first sub images respectively with the plurality of the third sub images.

9. The forged fingerprint identification method of claim 8, wherein the comparing the plurality of the first sub images respectively with the plurality of the third sub images includes:
selecting a head region from each of the plurality of the first sub images and the plurality of the third sub images depending on a direction of the movement for the input finger of the target user, and setting a threshold range between a first threshold value and a second threshold value as threshold conditions for the head region and a third threshold value among the threshold conditions for a residual partial region of each of the plurality of the first sub images and the plurality of the third sub images excluding the head region.

10. The forged fingerprint identification method of claim 9, wherein the determining of whether the fingerprint is the forgery further includes:

obtaining an intermediate gradient of the head region and an intermediate gradient of the residual partial region with respect to the first fingerprint image and the each third fingerprint image and counting a number of times an intermediate threshold condition is not satisfied based on a comparison of an intermediate gradient with the threshold range and the third threshold value;

obtaining a final gradient of the head region and a final gradient of the residual partial region with respect to the each third fingerprint image and the second fingerprint image and determining whether a final threshold condition is satisfied based on a comparison of the final gradient with the threshold range and the third threshold value; and determining that the fingerprint is not the forgery when the final threshold condition is satisfied and the number of times the intermediate threshold condition is not satisfied is less than a threshold number of times.

11. The forged fingerprint identification method of claim 10, wherein the third threshold value is adjusted according to a change in the direction of the movement for the input finger of the target user.

12. A forged fingerprint identification apparatus, the apparatus comprising:

a fingerprint image acquisition device configured to capture a fingerprint for an input finger of a user at a fingerprint input area formed on at least a portion of a display screen;

a touch sensor configured to sense a touch on a touch sensing area corresponding to the display screen;

a memory configured to store one or more instructions; and a processor configured to execute the one or more instructions stored in the memory, wherein the instructions, when executed by the processor, cause the processor to:

set a screen unlock pattern by an input finger of a reference user through detecting a movement for the input finger of the reference user on the display screen and determining a reference input angle between a pointing direction of the input finger of the reference user and a reference line set on the display screen;

determine a movement pattern for an input finger of a target user from a first position to a second position by:

capturing a fingerprint for the input finger of the target user at the first position within a fingerprint input area formed on at least a portion of the display screen and storing the fingerprint for the input finger of the target user at the first position as a first fingerprint image of the target user, wherein the capturing the fingerprint for the input finger of the target user at the first position includes determining a first input angle between a pointing direction of the input finger of the target user at the first position and the reference line set on the display screen;

detecting a movement for the input finger of the target user while in contact with the display screen;

determining the second position at which the movement for the input finger of the target user is stopped; and capturing the fingerprint for the input finger of the target user at the second position within the fingerprint input area and storing the fingerprint for the input finger of the target user at the second position as a second fingerprint image of the target user, wherein the capturing the fingerprint for the input finger of the target user at the second position includes determining a second input angle between a pointing direction of the input finger of the target user at the second position and the reference line set on the display screen; and determine whether the fingerprint of the target user is a forgery based on the first fingerprint image, the second fingerprint image and predetermined threshold conditions, wherein the determining of whether the fingerprint for the input finger of the target user is the forgery includes comparing at least one of the first input angle and the second input angle with the reference input angle and determining whether the fingerprint for the input finger of the target user is the forgery based on a comparison between the first input angle or the second input angle with the reference input angle, and wherein the movement for the input finger of the target user occurs from the first position to the second position, and the first position and the second position are different.

13. The forged fingerprint identification apparatus of claim 12, wherein the processor is configured to:

compare the first fingerprint image with the second fingerprint image and determine a first result of a comparison between the first fingerprint image and the second fingerprint image;

compare the first result of the comparison with the predetermined threshold conditions and determine a second result of a comparison between the first result of the comparison and predetermined threshold conditions; and determine whether the fingerprint of the target user for the input finger is the forgery based on the second result of comparison.

14. The forged fingerprint identification apparatus of claim 12, wherein the processor is configured to:

compare the movement pattern for the input finger of the target user with the screen unlock pattern; and determine whether the fingerprint is the forgery further based on a comparison between the movement pattern and the screen unlock pattern.

15. The forged fingerprint identification apparatus of claim 12, wherein the processor is configured to:

determine a first reference input angle between a pointing direction of the input finger of the reference user at the first position and a reference line set on the display screen and set the first reference input angle, and compare the first input angle with the first reference input angle and determine whether the fingerprint for the input finger of the target user is the forgery based on a comparison between the first input angle and the first reference input angle.

16. The forged fingerprint identification apparatus of claim 12,
wherein the processor is configured to control the fingerprint image acquisition device to capture each fingerprint for the input finger of the target user at one or more third positions within the fingerprint input area, respectively, and store the each fingerprint for the input finger of the target user as each third fingerprint image of the target user, and
wherein the processor is configured to:
compare at least two of the first fingerprint image, the second fingerprint image, and the each third fingerprint image; and
determine whether the fingerprint is the forgery based on a comparison between the at least two of the first fingerprint image, the second fingerprint image, and the each third fingerprint image.

17. The forged fingerprint identification apparatus of claim 16, wherein the one or more third positions within the fingerprint input area are based on a distance between the first position and the second position and a number of the each third fingerprint image.

18. A non-transitory computer readable storage medium storing computer executable instructions, wherein the instructions, when executed by a processor, cause the processor to perform a forged fingerprint identification method, the method comprising:
setting a screen unlock pattern by an input finger of a reference user through detecting a movement for the input finger of the reference user on a display screen and determining a reference input angle between a pointing direction of the input finger of the reference user and a reference line set on the display screen;
determining a movement pattern for an input finger of a target user from a first position to a second position by:
capturing a fingerprint for the input finger of the target user at the first position within a fingerprint input area formed on at least a portion of the display screen and storing the fingerprint for the input finger of the target user at the first position as a first fingerprint image of the target user, wherein the capturing the fingerprint for the input finger of the target user at the first position includes determining a first input angle between a pointing direction of the input finger of the target user at the first position and the reference line set on the display screen;
detecting a movement for the input finger of the target user while in contact with the display screen;
determining the second position at which the movement for the input finger of the target user is stopped; and
capturing the fingerprint for the input finger of the target user at the second position within the fingerprint input area and storing the fingerprint for the input finger of the target user at the second position as a second fingerprint image of the target user, wherein the capturing the fingerprint for the input finger of the target user at the second position includes determining a second input angle between a pointing direction of the input finger of the target user at the second position and the reference line set on the display screen; and
determining whether the fingerprint for the input finger of the target user is a forgery based on the first fingerprint image, the second fingerprint image and predetermined threshold conditions, wherein the determining of whether the fingerprint for the input finger of the target user is the forgery includes comparing at least one of the first input angle and the second input angle with the reference input angle and determining whether the fingerprint for the input finger of the target user is the forgery based on a comparison between the first input angle or the second input angle with the reference input angle, and wherein the movement for the input finger of the target user occurs from the first position to the second position, and the first position and the second position are different.

* * * * *